B. FORD.
METHOD OF CHANGING THE COMPOSITION OF IRON AND STEEL.
APPLICATION FILED JAN. 12, 1909.

1,062,388.

Patented May 20, 1913.

WITNESSES:
Rob't R. Kitchel
Frank O. Hunt

INVENTOR
Bruce Ford
BY
Augustus B. Stoughton
ATTORNEY.

UNITED STATES PATENT OFFICE.

BRUCE FORD, OF PHILADELPHIA, PENNSYLVANIA.

METHOD OF CHANGING THE COMPOSITION OF IRON AND STEEL.

1,062,388. Specification of Letters Patent. Patented May 20, 1913.

Application filed January 12, 1909. Serial No. 471,873.

*To all whom it may concern:*

Be it known that I, BRUCE FORD, a citizen of the United States, and a resident of Philadelphia, in the county of Philadelphia and State of Pennsylvania, have invented certain new and useful Improvements in the Method of Changing the Composition of Iron and Steel, of which the following is a specification.

The composition of iron and steel may be changed to a substantial depth or throughout the mass by cementation or de-cementation, but the processes heretofore employed for this purpose required for their completion a great lapse of time, measurable by days. Case hardening or the carburizing of a mere surface skin has been accomplished by electrically or otherwise heating the metal to or below its welding temperature and while hot rubbing the surface with a suitable steelifying material, such as potassium cyanid. This can be quickly accomplished, but it results in the production of a mere superficial skin.

The principal object of the present invention is to provide an expeditious method for accurately controlling or changing the carbon contents and hardening constituents of iron and steel throughout the mass or to a substantial depth. To this end I heat the metal to above its welding heat and even melt it (though the melting process forms the subject-matter of my application serially numbered 255,359 dated April 13th, 1905) while in contact with a medium adapted to operate absorptively by contact, or by cementation or de-cementation.

My process is based upon the marked rapidity with which the change in composition occurs for a comparatively small elevation of the temperature of the metal above the temperature heretofore employed in cementation or de-cementation processes, which temperature was below or approached the temperature of the welding point of the metal. I contemplate practising the process at a temperature above the temperature of the welding point of the metal, even up to or beyond its melting point, the latter being described and claimed in my application above referred to.

Figure 1:
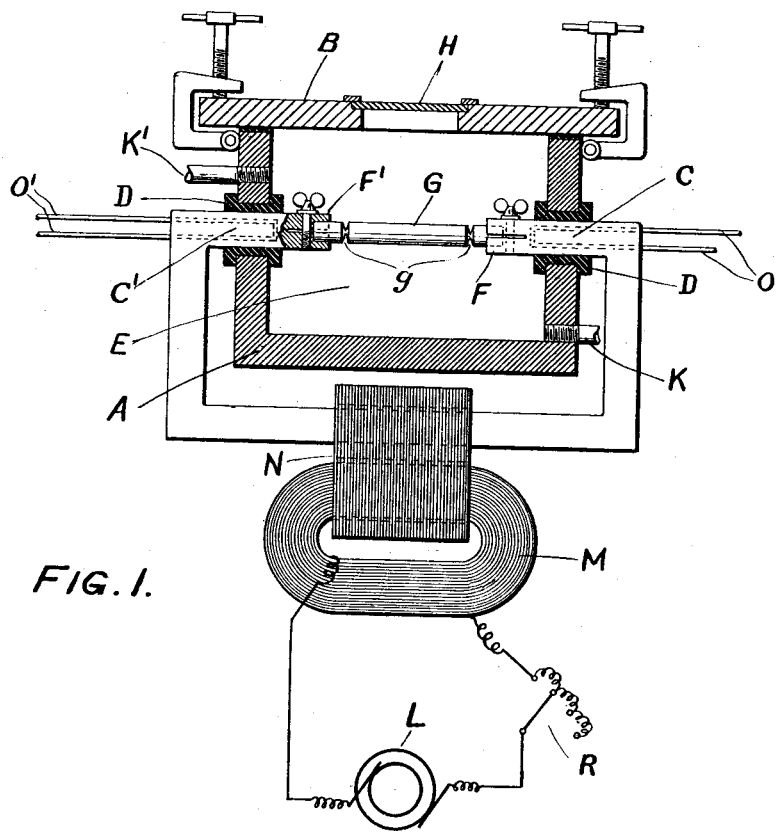
Figure 2:
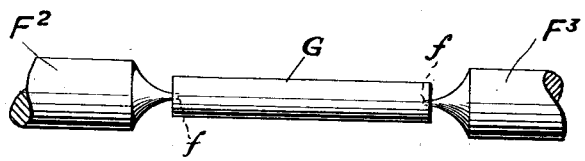
Figure 3:
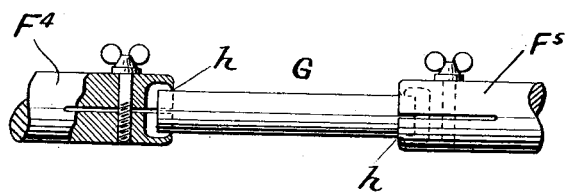

The drawings illustrate one, but not the only, type of apparatus which may be used for the practice of the process of the invention, and in them Figure 1, is a sectional view partly diagrammatic, illustrating such apparatus, and Figs. 2 and 3, are detail views illustrating modifications of the contact.

To practise the process of the invention the metal is exposed to or immersed in a suitable medium and while permitted to remain or stay therein, is heated in such a way that the temperature of its body or mass is raised above its welding point. The metal remains exposed to these conditions until the composition of the whole of it is changed or until its composition is changed to the desired depth, which is a matter of, comparatively, a very short time, measurable in minutes or hours as distinguished from hours or days or even weeks (according to the heat applied and depth required) in the cementation and de-cementation processes. The temperature to which the body or mass of metal is heated can be accurately controlled and regulated during the entire period of time in which the metal remains immersed in or exposed to the medium by the use of electric heat. The medium may be of a carbonizing nature, in which case the effect is to cause the iron to absorb or take on carbon, thus producing the well known changes in it which are due to the addition of carbon; on the other hand the medium may be of a de-carbonizing character, in which case it deprives the iron or steel of carbon, thus producing in it corresponding changes.

For the sake of a further description, an explanation of the method as practised in the apparatus shown will now be given.

A, is a receptacle as of cast iron preferably fitted with a removable cover B. Conductor bars C and $C^1$ lead into the receptacle A, but are insulated therefrom by the bushings D. Within the receptacle is the medium E, which may be either gas, vapor, liquid, or a granular or powdered mass.

F, $F^1$, are contact pieces for the conductors C, $C^1$ and between these is mounted and clamped the iron or steel G to be treated. A panel H, of transparent substance, such as glass, may for convenience, be put in the wall or cover of the receptacle and through this the progress of the process can be inspected. If the medium E is a gas or vapor it may be allowed to circulate by means of the inlet and outlet pipes K, $K^1$. The source of power L, is in the case shown, an alternating current generator connected to a primary coil M, of a transformer N. The secondary coil of the transformer is formed by the conductors C, C¹. The conductors C, C¹, may be kept cool as by a circulation of water through them by means of the tubes O and O¹. The iron or steel to be treated is clamped across the contacts F, F¹ and sufficient current is turned on and controlled by means of the controller R, in the primary circuit to heat the mass or body of the metal G, above its welding temperature, whereupon it rapidly absorbs or gives up carbon or other hardening constituents from or to the medium according to its nature and in the manner described. Obviously the receptacle A, is not substantially heated and therefore it is not affected, so that substantially all of the constituents of the medium and all of the heat is available to the metal under treatment. For the sake of a further explanation it may be stated that for each square inch of cross-section of the metal to be treated there is required approximately 2,000 to 10,000 amperes and for each foot in length of the metal to be treated there is required from two to five volts, according to the shape of its cross-section and the capacity of the medium for taking away heat, but at any rate the current must be sufficient to heat the metal above its welding point and as its temperature is further increased the change in composition occurs more rapidly.

As an illustration of a carbonizing medium reference may be made to the fumes of gasolene, some appropriate form of cyanogen, ground carbon, lamp black, bone black, or the like, or a mixture of these or some of these; and as an illustration of a decarbonizing medium reference may be made of powdered haematite and the like. While reference has been made to adding carbon to iron or steel, it is obvious that by the present method other substances can be added, for example, the medium may contain manganese or silicon in some appropriate form, or in fact any of those substances which are availed of in the treatment of iron and steel. By the described method it is possible to first form articles into the required shape and to then treat them; the time required for treatment is exceedingly short, being a matter of minutes rather than hours, as in the old process of cementation.

There is interposed in the circuit high resistance at or near the ends of the parts to be treated, the purpose of this is to compensate for the heat conducted away by the contact portions F, F¹, and thus insure the uniform heating of the piece or mass throughout its length. This can be accomplished by reducing the cross-sectional area of the ends of the piece, as at $g$. The ends of the piece beyond the part $g$, may be subsequently broken off while the part intermediate of the portions $g$, will be uniformly heated and changed. As shown in Figs. 2 and 3, resistance is provided at the ends of the piece in a different manner; in Fig. 2, the cross-section of the contacts F², F³, is reduced and for convenience they may be inserted into cavities $f$, in the ends of the piece $g$. In Fig. 3, the surface of contact between the metal $g$, and the contacts F⁴ and F⁵ is made small as at $h$, and therefore of high resistance.

What I claim is:

1. In the process of changing the composition of iron and steel by electrically heating it between contacts and in the presence of a suitable medium, that improvement which consists in increasing the electrical resistance of the metal at or near the contacts to provide heat to compensate for heat conducted away by the contacts.

2. In the art of changing the composition of iron and steel by interposing it in an electric circuit in the presence of a suitable medium, that improvement which consists in interposing in the circuit resistance at or near the ends of the part to be treated higher than the resistance of the rest of the circuit.

3. In the process of changing the composition of iron and steel by electrically heating it between contacts and in the presence of a suitable medium, that improvement which consists in increasing the electrical resistance of the circuit at or near the contacts to provide heat to compensate for heat conducted away by the contacts.

4. In the process of electrically heating an object between contacts that improvement which consists in heating the object uniformly by increasing the electrical resistance of the circuit at or near the contacts to provide heat to compensate for heat conducted away by both contacts.

5. In the process of electrically heating an object between contacts that improvement which consists in reducing the cross-sectional area of the ends of the body and thereby increasing the electrical resistance of the circuit at or near both contacts to provide heat to compensate for heat conducted away by the contacts.

In testimony whereof I have hereunto signed my name.

BRUCE FORD.

In the presence of—
 GEO. M. HOWARD,
 LEONARD H. WORNE.